US012410907B2

(12) United States Patent
Li et al.

(10) Patent No.: US 12,410,907 B2
(45) **Date of Patent: *Sep. 9, 2025**

(54) DOWNLIGHT WITH MULTIPLE INSTALLATION METHODS

(71) Applicant: Xiamen Longstar Lighting Co., Ltd., Fujian (CN)

(72) Inventors: Xilong Li, Fujian (CN); Zhiyuan Zhang, Fujian (CN); Jinbo Liu, Fujian (CN); Ling Ye, Fujian (CN); Hairong Wang, Fujian (CN)

(73) Assignee: Xiamen Longstar Lighting Co., Ltd., Xiamen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/766,183

(22) Filed: Jul. 8, 2024

(65) Prior Publication Data

US 2025/0137624 A1 May 1, 2025

(30) Foreign Application Priority Data

Oct. 27, 2023 (CN) ......................... 202322895242.9

(51) Int. Cl.

| | |
|---|---|
| ***F21V 21/04*** | (2006.01) |
| ***F21S 8/02*** | (2006.01) |
| ***F21V 7/04*** | (2006.01) |
| ***F21V 23/04*** | (2006.01) |

(52) U.S. Cl.
CPC ............ *F21V 21/047* (2013.01); *F21S 8/026* (2013.01); *F21V 7/04* (2013.01); *F21V 23/04* (2013.01)

(58) Field of Classification Search
CPC .......... F21V 21/047; F21V 7/04; F21V 23/04; F21S 8/026
See application file for complete search history.

(56) References Cited

U.S. PATENT DOCUMENTS

| | | | | |
|---|---|---|---|---|
| 10,677,444 | B2 * | 6/2020 | Huang .................... | F21V 29/87 |
| 12,241,598 | B2 * | 3/2025 | Halliwell ............... | H05B 45/10 |

* cited by examiner

*Primary Examiner* — Matthew J. Peerce
(74) *Attorney, Agent, or Firm* — Cooper Legal Group, LLC

(57) ABSTRACT

A downlight with multiple installation methods includes a cover, a reflector cup, a light source, a housing, and two springs. The housing has a boss extending along a thickness direction of the housing, and an opening surface of the boss extends radially outward to form a skirt. The cover is disposed on the opening surface of the boss to be spliced to the housing to form a cavity for accommodating the reflector cup and the light source. The reflector cup is disposed on a light-emitting surface of the light source to enable light emitted by the light source to be reflected to be emitted out of the cover. The housing includes two slots symmetrically located on an outer side of the boss, and the two springs are detachably connected to the two slots.

6 Claims, 4 Drawing Sheets

DOWNLIGHT WITH MULTIPLE INSTALLATION METHODS

RELATED APPLICATIONS

This application claims priority to Chinese patent application number 202322895242.9, filed on Oct. 27, 2023. Chinese patent application number 202322895242.9 is incorporated herein by reference.

FIELD OF THE DISCLOSURE

The present disclosure relates to a lighting device, and in particular to a downlight.

BACKGROUND OF THE DISCLOSURE

Springs of traditional downlights are secured by screws, which is troublesome in production. Additionally, the springs stand upright, increasing a size of a packaging box and significantly adding to cost.

BRIEF SUMMARY OF THE DISCLOSURE

The technical problem to be solved by the present disclosure is to provide a downlight that reduces the costs of assembling and packaging springs.

In order to solve the above technical problems, the present disclosure provides a downlight with multiple installation methods, comprising a cover, a reflector cup, a light source, a housing, and two springs. The housing has a boss extending along a thickness direction of the housing, and an opening surface of the boss extends radially outward to form a skirt. The cover is disposed on the opening surface of the boss to be spliced to the housing to form a cavity for accommodating the reflector cup and the light source. The reflector cup is disposed on a light-emitting surface of the light source to enable light emitted by the light source to be reflected to be emitted out of the cover. The housing comprises two slots symmetrically located on an outer side of the boss, and the two springs are detachably connected to the two slots.

In a preferred embodiment, each of the two slots comprises two side walls spaced apart from each other in a thickness direction of the two slots, and a side wall of the two side walls away from the boss comprises a buckling block configured to be buckled to a corresponding one of the two springs. The buckling block is defined on a rib. A first end of the rib is a fixed end, and a second end of the rib is a free end, so that the rib can be driven by an external force to enable the buckling block to swing in a direction of releasing a buckling connection with the corresponding one of the two springs.

In a preferred embodiment, the buckling block comprises an inclined surface. When the corresponding one of the two springs is inserted into a corresponding one of the two slots, a force generated by the two springs pressing the inclined surface causes the rib and the buckling block to swing in the direction of releasing the buckling connection with the corresponding one of the two springs.

In a preferred embodiment, each of the two springs comprises two supporting arms and an insertion portion for insertion into the two slots, and the two supporting arms extend in opposite directions.

In a preferred embodiment, the insertion portion is connected to the two supporting arms by a transition portion extending in a horizontal direction, and the two springs are configured to be inserted into the two slots in different directions so as to enable the transition portions of the two springs to extend to face each other or face away from each other to adjust a distance between two sets of the two supporting arms of the two springs.

In a preferred embodiment, the downlight comprises a toggle switch for changing color temperature, and the toggle switch is disposed on a back of the boss and is connected to a driver circuit board on the light source.

In a preferred embodiment, the downlight comprises a toggle switch for changing color temperature, and the toggle switch is disposed on a side of the skirt facing a light-emitting direction and is connected to the driver circuit board on the light source.

Compared with the existing techniques, the technical solution has the following advantages.

The present disclosure provides the downlight that allows the two springs to be buckled to the housing when installing the downlight. Therefore, the downlight and the two springs can be packaged separately when leaving the factory, reducing a height of the downlight and directly lowering packaging costs.

DETAILED DESCRIPTION OF THE EMBODIMENTS

Figure 1:
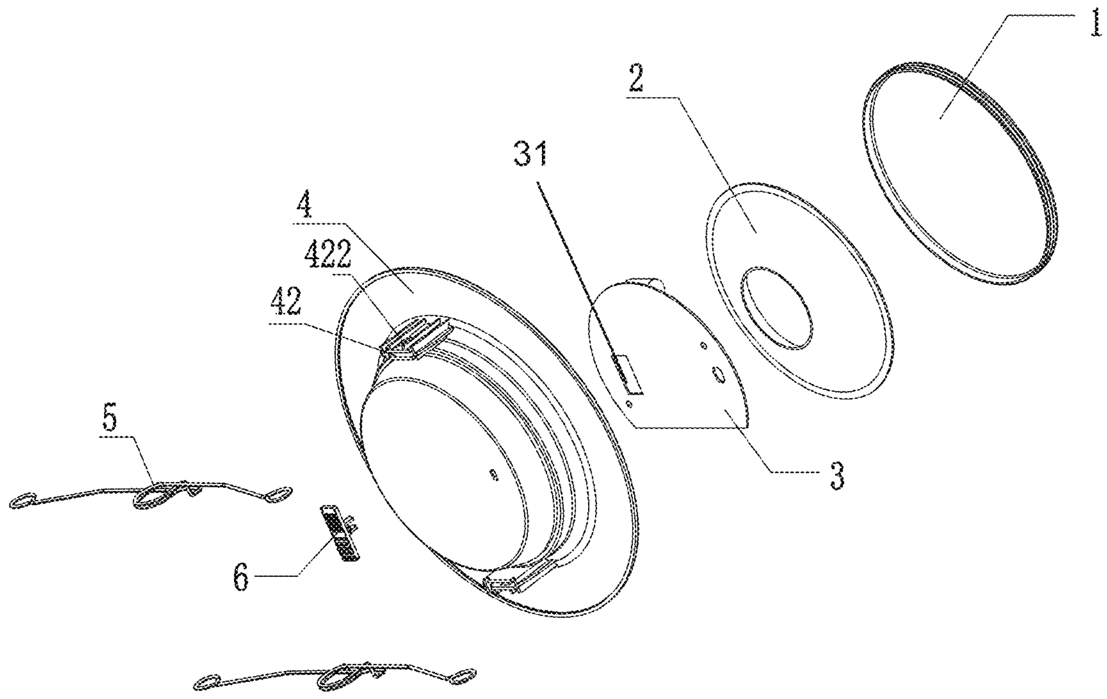
FIG. 1 is an exploded view of a preferred embodiment of the present disclosure.

The following will clearly and completely describe the technical solutions in the embodiments of the present disclosure with reference to the accompanying drawings. Obviously, the described embodiments are only a portion of the embodiments of the present disclosure, and not all of the embodiments. Based on the embodiments of the present disclosure, all other embodiments obtained by those of ordinary skill in the art without creative work fall within the protection scope of the present disclosure.

In the description of the present disclosure, it should be noted that the terms “upper”, “lower”, “inner”, “outer”, “top end”, bottom end”, etc. indicate the orientation or positional relationship based on the orientation shown in the drawings. The positional relationship is only for the convenience of describing the present disclosure and simplifying the description, rather than indicating or implying that the referenced device or element must have a specific orientation, be constructed, and be operated in a specific orientation. Therefore, the positional relationship should not be understood as a limitation of the present disclosure. In addition, the terms “first” and “second” are only used for descriptive purposes and should not be understood as indicating or implying relative importance.

In the description of the present disclosure, it should be noted that the terms “installed”, “provided with”, “sleeved/connected”, “connected”, etc., should be understood broadly. For example, “connected” can be a wall hanging connection, a detachable connection, or an integral connection, a mechanical connection, an electrical connection, a direct connection, or an indirect connection through an intermediate medium, and it can be a connection between two members. For those of ordinary skill in the art, the specific meaning of the above terms in the present disclosure can be understood under specific conditions.

Figure 2:
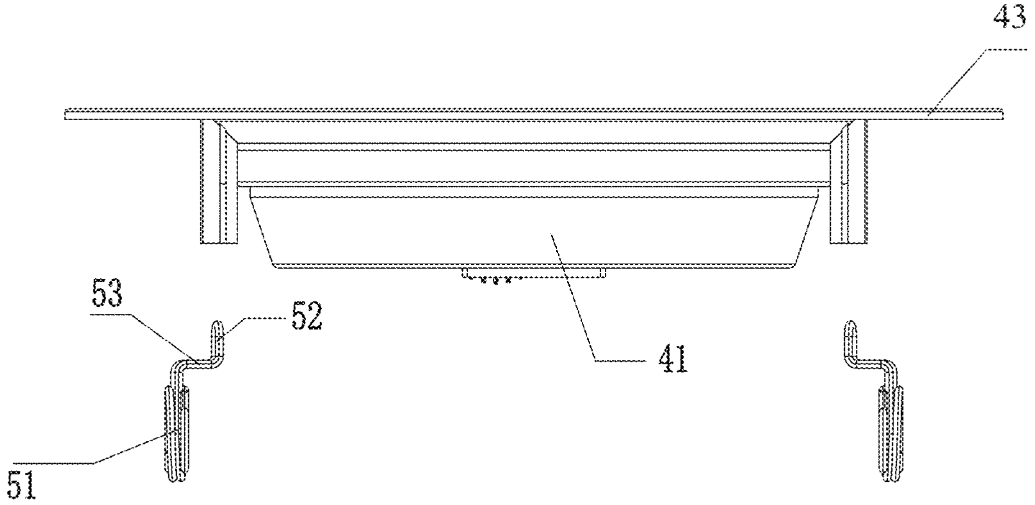
FIG. 2 is a schematic diagram of one type of installation method of multiple installation methods of the present disclosure.
Figure 3:
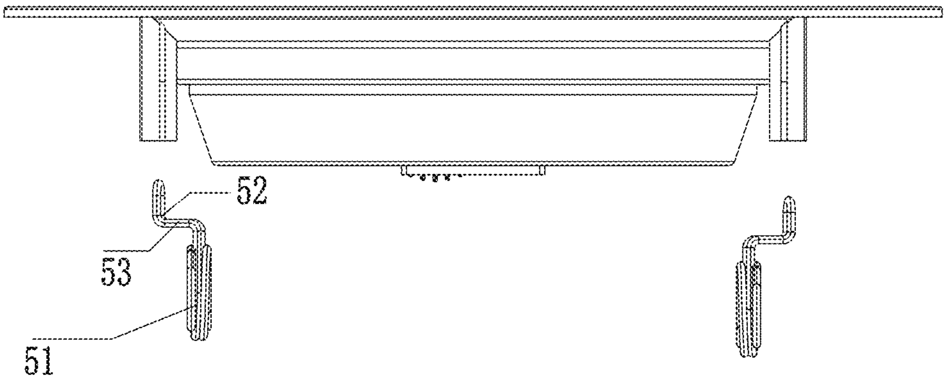
FIG. 3 is a schematic diagram of another type of installation method of the multiple installation methods of the present disclosure.
Figure 4:
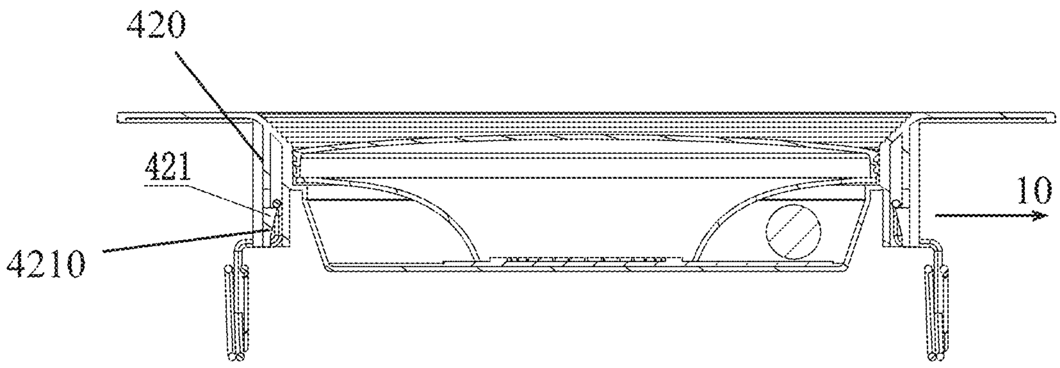
FIG. 4 is a schematic diagram of two springs and buckling blocks of the present disclosure.

Referring to FIGS. 1 to 4, this embodiment discloses a downlight with multiple installation methods, comprising: a cover 1, a reflector cup 2, a light source 3, a housing 4, and two springs 5.

The housing 4 has a boss 41 extending along a thickness direction of the housing 4, and an opening surface of the boss 41 (i.e., a surface of the boss 41 defining an opening) extends radially outward to form a skirt 43. The cover 1 is disposed on the opening surface of the boss 41 to be spliced to the housing 4 to form a cavity for accommodating the reflector cup 2 and the light source 3. The reflector cup 2 is disposed on a light-emitting surface of the light source 3 to enable light emitted by the light source 3 to be reflected to be emitted out of the cover 1.

The housing 4 comprises two slots 42 symmetrically located on an outer side of the boss 41. The two springs 5 are detachably connected to the two slots 42.

To form the aforementioned detachable fit, each of the two slots 42 comprises two side walls 420 spaced apart from each other in a thickness direction of the two slots 42, and a side wall of the two side walls 420 away from the boss 41 comprises a buckling block 421 configured to be buckled to a corresponding one of the two springs 5. The buckling block 421 is defined on a rib 422 (e.g., a cantilever on the side wall of the two side walls 420). A first end of the rib 422 is a fixed end, and a second end of the rib 422 is a free end, so that the rib 422 can be driven by an external force to enable the buckling block 421 to swing in a direction 10 of releasing a buckling connection with the corresponding one of the two springs 5. Therefore, the external force can act on the rib 422 to release an interlocking connection between the buckling block 421 and the corresponding one of the two springs 5, and the corresponding one of the two springs 5 can be taken out of a corresponding one of the two slots 42.

The above structure enables a separation of the buckling block 421 and the corresponding one of the two springs 5. To allow the two springs 5 to be inserted into the two slots 42 and to be buckled to the buckling blocks 421 of the two slots 42, the buckling block 421 comprises an inclined surface 4210. When the two springs 5 are inserted into the two slots 42, a force generated by the two springs 5 pressing the inclined surfaces 4210 causes the ribs 422 and the buckling blocks 421 to swing in the direction 10 of releasing the buckling connection with the two springs 5.

In this embodiment, each of the two springs 5 comprises two supporting arms 51 and an insertion portion 52 for insertion into the two slots 42. The two supporting arms 51 extend in opposite directions. The insertion portion 52 is connected to the two supporting arms 51 by a transition portion 53 extending in a horizontal direction. The two springs 5 are inserted into the two slots 42 in different directions so as to allow the transition portions 53 of the two springs 5 to face each other or face away from each other to adjust a distance between two sets of the two supporting arms 51 of the two springs 5.

This embodiment also includes a toggle switch 6 for changing color temperature. The toggle switch 6 is disposed on a back of the boss 41 and is connected to a driver circuit board 31 on the light source 3. As a simple alternative, the toggle switch 6 is disposed on a side of the skirt 43 facing a light-emitting direction and is connected to the driver circuit board 31 on the light source 3.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. A downlight with multiple installation methods, comprising:
- a cover,
- a reflector cup,
- a light source,
- a housing, and
- two springs, wherein:
  - the housing has a boss extending along a thickness direction of the housing,
  - an opening surface of the boss extends radially outward to form a skirt,
  - the cover is disposed on the opening surface of the boss and spliced to the housing to form a cavity for accommodating the reflector cup and the light source,
  - the reflector cup is disposed on a light-emitting surface of the light source to reflect light emitted by the light source such that the light is emitted out of the cover,
  - the housing comprises two slots symmetrically located on an outer side of the boss,
  - the two springs are detachably connected to the two slots,
  - each of the two slots comprises two side walls spaced apart from each other in a thickness direction of the two slots,
  - a side wall of the two side walls away from the boss comprises a buckling block configured to be buckled to a corresponding one of the two springs,
  - the buckling block is defined on a rib, and
  - a first end of the rib is a fixed end, and a second end of the rib is a free end, so that the rib is configured to be driven by an external force to enable the buckling block to swing in a direction of releasing a buckling connection with the corresponding one of the two springs.

2. The downlight with the multiple installation methods according to claim 1, wherein:
- the buckling block comprises an inclined surface, and
- when the corresponding one of the two springs is inserted into a corresponding one of the two slots, a force generated by the two springs pressing the inclined surface causes the rib and the buckling block to swing in the direction of releasing the buckling connection with the corresponding one of the two springs.

3. The downlight with the multiple installation methods according to claim 1, wherein:
- each of the two springs comprises two supporting arms and an insertion portion for insertion into the two slots, and
- the two supporting arms extend in opposite directions.

4. The downlight with the multiple installation methods according to claim 3, wherein:
- the insertion portion is connected to the two supporting arms by a transition portion extending in a horizontal direction, and
- the two springs are configured to be inserted into the two slots in different directions so as to enable the transition portions of the two springs to extend to face each other or face away from each other to adjust a distance between two sets of the two supporting arms of the two springs.

5. The downlight with the multiple installation methods according to claim 1, wherein:

the downlight comprises a toggle switch for changing color temperature, and the toggle switch is disposed on a back of the boss and is connected to a driver circuit board on the light source.

6. The downlight with the multiple installation methods according to claim 1, wherein:

the downlight comprises a toggle switch for changing color temperature, and the toggle switch is disposed on a side of the skirt facing a light-emitting direction and is connected to a driver circuit board on the light source.

* * * * *